US012068698B2

(12) United States Patent
Narayanasamy et al.

(10) Patent No.: US 12,068,698 B2
(45) Date of Patent: Aug. 20, 2024

(54) COMMON WIRE FULL-WAVE RECTIFIER CIRCUIT

(71) Applicant: TEXAS INSTRUMENTS INCORPORATED, Dallas, TX (US)

(72) Inventors: Navaneeth Kumar Narayanasamy, Tamilnadu (IN); Sanjay Dixit, Haryana (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 73 days.

(21) Appl. No.: 17/538,544

(22) Filed: Nov. 30, 2021

(65) Prior Publication Data

US 2023/0170821 A1    Jun. 1, 2023

(51) Int. Cl.
*H02M 7/217*    (2006.01)
*H02M 1/08*    (2006.01)
*F24F 11/88*    (2018.01)
*H02M 3/00*    (2006.01)

(52) U.S. Cl.
CPC .............. *H02M 7/217* (2013.01); *H02M 1/08* (2013.01); *F24F 11/88* (2018.01); *H02M 3/00* (2013.01)

(58) Field of Classification Search
CPC .......... H02M 7/217; H02M 1/08; H02M 3/00; F24F 11/88
USPC ........................................................ 363/127
See application file for complete search history.

(56) References Cited

U.S. PATENT DOCUMENTS

| 9,748,852 | B2* | 8/2017 | Freeman | H02M 3/33553 |
| 2006/0202640 | A1* | 9/2006 | Alexandrov | H05B 47/185 |
| | | | | 315/291 |
| 2007/0040516 | A1* | 2/2007 | Chen | H05B 39/045 |
| | | | | 315/291 |
| 2008/0002444 | A1* | 1/2008 | Shekhawat | H02M 1/34 |
| | | | | 363/127 |
| 2008/0197910 | A1* | 8/2008 | Isomura | B60H 1/00428 |
| | | | | 327/520 |
| 2020/0178372 | A1* | 6/2020 | Benning | H05B 39/048 |

* cited by examiner

*Primary Examiner* — Yemane Mehari
(74) *Attorney, Agent, or Firm* — Ray A. King; Frank D. Cimino

(57) ABSTRACT

In an example, a rectifier circuit includes first and second capacitors, first and second current control devices, and a switch. The first current control device is configured to provide an input current to the first capacitor during a positive cycle of an alternating current (AC) input voltage. The second capacitor is configured to store a charge and the switch is configured to couple the second capacitor to a ground terminal so the second capacitor discharges a capacitor current during the positive cycle of the input voltage responsive to the stored charge in the second capacitor. The second current control device is configured to provide the capacitor current to the first capacitor during the positive cycle of the input voltage. The first capacitor is configured to store a charge responsive to the input current and the capacitor current.

20 Claims, 7 Drawing Sheets

COMMON WIRE FULL-WAVE RECTIFIER CIRCUIT

TECHNICAL FIELD

This description relates to rectifiers, and more specifically to a full-wave rectifier circuit.

BACKGROUND

A rectifier is an electrical device that converts alternating current (AC), which periodically reverses direction, to a direct current (DC), which flows in only one direction. A half-wave rectifier is configured to pass either a positive or negative half of an AC wave to an output (e.g., a pulsating DC wave), while the other half of the AC wave is blocked. By contrast, a full-wave rectifier is configured to pass both of the positive and negative half cycles of the AC waveform to provide the output.

SUMMARY

In a described example, a circuit includes a first capacitor and a first current control device that can be configured to provide an input current to the first capacitor during a positive cycle of an AC input voltage, and a second capacitor having first and second terminals. The second capacitor can be configured to store a charge. The circuit further includes a switch that can be coupled between the first terminal of the second capacitor and a ground terminal. The switch can be configured to couple the second capacitor to the ground terminal so the second capacitor discharges a capacitor current during the positive cycle of the input voltage responsive to the stored charge in the second capacitor. The circuit further includes a second current control device that can be configured to provide the capacitor current to the first capacitor during the positive cycle of the input voltage. The first capacitor can be configured to store a charge responsive to the input current and the capacitor current.

In another described example, a system includes a rectifier having an input and an output, the input coupled to an input terminal configured to receive an AC input voltage at the input. The rectifier circuit includes a first capacitor and a first current control device that can be configured to provide an input current to the first capacitor during a positive cycle of the AC input voltage, and a second capacitor having first and second terminals. The second capacitor can be configured to store a charge. The rectifier further includes a switch that can be coupled between the first terminal of the second capacitor and a ground terminal. The switch can be configured to couple the second capacitor to the ground terminal so the second capacitor discharges a capacitor current during the positive cycle of the input voltage responsive to the stored charge in the second capacitor. The rectifier further includes a second current control device that can be configured to provide the capacitor current to the first capacitor during the positive cycle of the input voltage. The first capacitor can be configured to store a charge responsive to the input current and the capacitor current. The system further includes a power converter having an input and an output. The input of the power converter can be coupled to the output of the rectifier. The power converter can be configured to provide a regulated output voltage at its output based on a DC output voltage at the output of the rectifier.

In a further described example, a circuit can include a first current control device having an input and an output. The circuit further includes a second current control device having an input and an output. The input of the second current control device can be coupled to the output of the first current control device. The circuit further includes a third current control device having an input and an output. The output of the third current control device can be coupled to the output of the second current control device. The circuit further includes a fourth current control device having an input and an output. The output of the fourth current control device can be coupled to the input of the third current control device and the input of the fourth current control device can be coupled to a common terminal. The circuit further includes a first capacitor having a first terminal and a second terminal. The first terminal of the first capacitor can be coupled to the output of the second current control device. The second terminal of the first capacitor can be coupled to the common terminal. The circuit further includes a second capacitor having a first terminal and a second terminal. The first terminal of the second capacitor can be coupled to the input of the first current control device and the second terminal of the second capacitor can be coupled to the input of the third current control device and to the output of the fourth current control device. The circuit further includes a switch having a first input and a second input. The first input of the switch can be coupled to the first terminal of the second capacitor, and the second input of the switch can be coupled to the common terminal.

DETAILED DESCRIPTION

Figure 1:
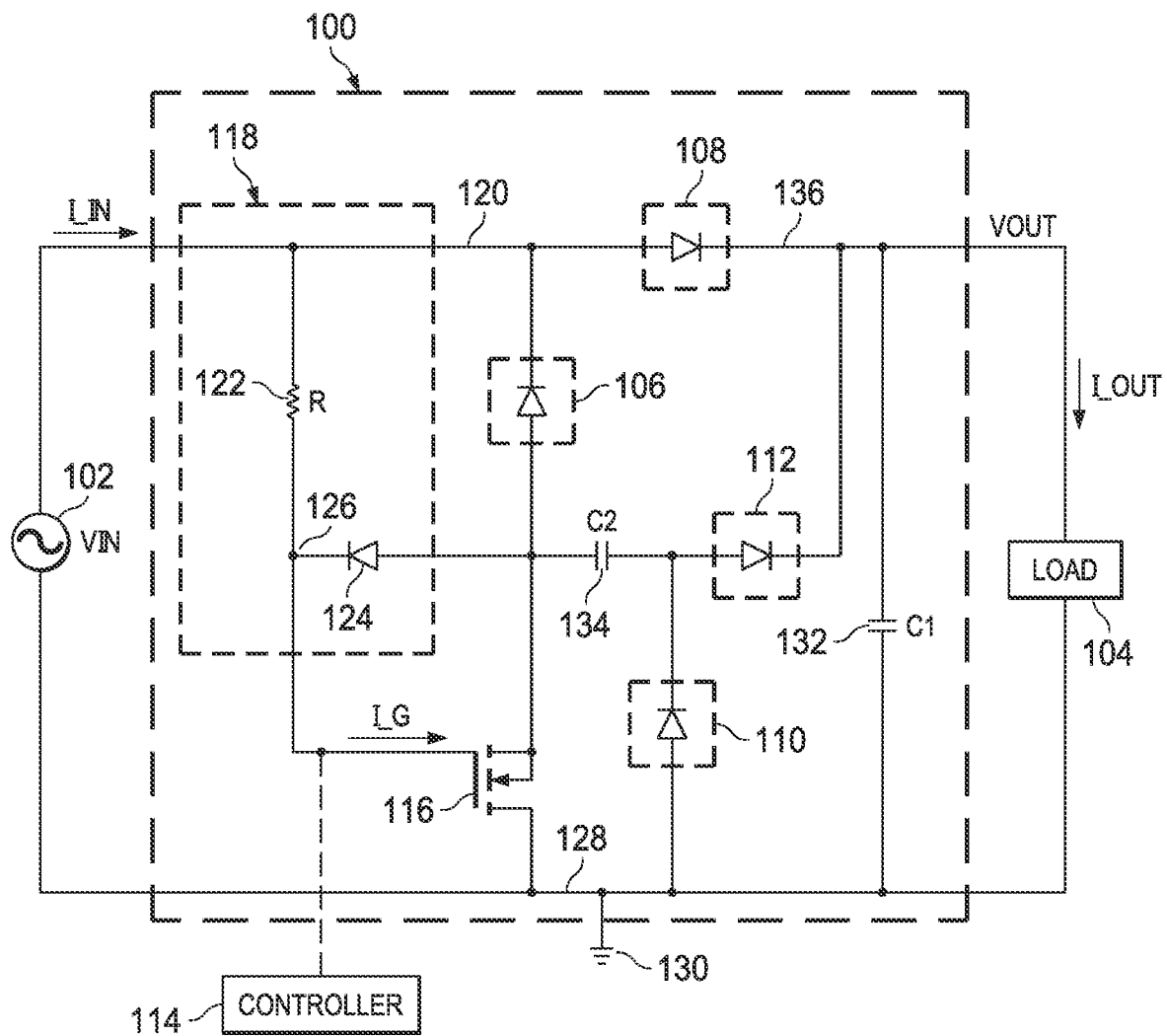
FIG. 1 is a schematic diagram of a full-wave rectifier circuit.

This description relates generally to rectifiers. Rectifiers are used as part of a power supply circuit in HVAC controllers (e.g., zone controllers, damper controllers, etc.) to convert an AC input voltage to a DC output voltage. Analog and digital inputs/outputs in HVAC controllers are typically non-isolated and use a same reference wire (e.g., neutral wire) and thus require the use of half-bridge rectifiers for converting the AC input voltage provided by a step-down transformer of the power supply circuit to a DC output voltage for a downstream DC-DC converter of the power supply circuit. However, the use of half-bridge rectifiers in power supply circuitry leads to increased peak input currents (e.g., during a positive half cycle of the AC input voltage).

Higher peak input currents of HVAC controllers necessitate using higher-VA rated step-down transformers to provide the AC input voltage to the half-wave rectifier. However, the use of higher-volt-amps (VA) rated step-down transformers results in larger-sized transformers in the power supply circuitry of an HVAC controller, which increases HVAC controller manufacturing costs. In other alternative approaches, the half-bridge rectifier is replaced with a voltage doubler circuit to provide the DC output voltage. The voltage doubler circuit can draw current in both the positive and half cycles of the AC input voltage and retains a common neutral wire. However, the use of the voltage doubler circuit requires that the downstream DC-DC converter is rated for higher input DC voltage as the voltage doubler circuit, which generates an output voltage that is twice the peak of the AC input voltage. In other alternative approaches, full wave rectifier can be used to reduce the peak input currents, however, such circuits do not have a common wire between input and output, thereby necessitating isolated communication between HVAC devices.

Disclosed herein are examples of a common wire full-wave rectifier circuit for use in controllers in HVAC systems. The full-wave rectifier circuit as described herein retains a common reference (e.g., a common reference wire) and can draw current during each negative and positive cycle of an AC input voltage. The full-wave rectifier circuit described herein can have an input peak current that can be half an amplitude of the half-bridge rectifier circuit and thus eliminating the need for higher rated VA step-down transformers. Further, the full-wave rectifier circuit as described herein can provide a DC output voltage with a peak amplitude that is about or similar to a peak amplitude of the AC input voltage. Moreover, because the full-wave rectifier circuit as described herein does not double the DC output voltage as voltage doubler circuits, a lower-rated downstream DC-DC converter can be used for generating a DC operating voltage.

Examples are described herein wherein the full-wave rectifier circuit is used in power supply circuits for powering HVAC controllers/devices. However, the full-wave rectifier circuit described herein can be used in any power supply circuit needing AC-to-DC power conversion.

FIG. 1 is a schematic diagram of a full-wave rectifier circuit 100. The full-wave rectifier circuit 100 can be configured to provide a DC output voltage (labeled as "VOUT") based on an AC input voltage (labeled as "VIN"). The AC input voltage can be provided by an AC voltage source 102. The full-wave rectifier circuit 100 can be configured to convert the AC input voltage into the DC output voltage utilizing both halves of each cycle of the AC input voltage. Thus, the full-wave rectifier circuit 100 can be configured to draw an input current (labeled as "I_IN") provided by the AC voltage source 102 during each positive and negative cycle of the input current. The full-wave rectifier circuit 100 can be configured to provide a load 104 with the DC output voltage.

In some examples, the full-wave rectifier circuit 100 is or forms part of a power supply circuit for supplying electrical power to an electrical load (e.g., the load 104). In some examples, the power supply circuit is employed in an HVAC controller or device, as described herein. Thus, in some examples, the full-wave rectifier circuit 100 is used to provide a DC voltage to a downstream DC-DC converter for powering one or more components of the HVAC controller or device. In examples wherein the full-wave rectifier circuit 100 is used in the HVAC controller, the AC voltage source 102 is a step-down transformer, and the load is the downstream DC-DC converter.

The full-wave rectifier circuit 100 includes current control devices 106, 108, 110, and 112. In the example of FIG. 1, the current control devices 106, 108, 110, and 112 are implemented as diodes. In other examples, the current control devices 106, 108, 110, and 112 can be implemented as switches. In examples wherein the current control devices 106, 108, 110, and 112 are implemented as switches, a controller 114 can be coupled to each of the current control devices 106, 108, 110, 112 to allow for selective control of each of the current control devices 106, 108, 110, 112. The controller 114 can be configured to provide a respective switch control signal to selectively enable each of the current control devices 106, 108, 110, 112 to provide for full-wave rectification of the AC input voltage.

By way of further example, the full-wave rectifier circuit 100 includes a transistor 116. The transistor 116 in the example of FIG. 1 is illustrated as a metal-oxide-semiconductor field-effect transistor (MOSFET). In other examples, a different type of transistor is used to implement the transistor 116. A gate control circuit 118 is coupled between an input node 120 (e.g., an input terminal) and the transistor 116. The gate control circuit 118 can be configured to supply a gate current (labeled as "I_G") to drive a gate of the transistor 116 based on the AC input voltage. For example, the gate control circuit 118 includes a resistor 122 with a resistance R, and a Zener diode 124. During a positive cycle of the AC input voltage, the gate current can be supplied to the gate of the transistor 116 from a node 126 to switch the transistor 116 from an off-state to an on-state. Thus, a gate voltage can be established at the node 126. During the off-state, no current flows from a source to a drain of the transistor 116. By contrast, during the on-state, current flows from the source to the drain of the transistor 116.

The drain of the transistor 116 is coupled to a ground terminal 130. Because the AC voltage source 102 and the load 104 are coupled to the node 128 and the node 128 is coupled to the ground terminal 130, the node 128 can be referred to as a common ground node (e.g., a ground terminal). The source of the transistor 116 can be coupled to an input of the current control device 106 and an input of the Zener diode 124. An output of the Zener diode 124 is coupled to the node 126, which couples the Zener diode 124 to the resistor 122 and the gate of the transistor 116. An output of the current control device 106 is coupled to the input node 120, which couples the current control device 106 to an input of the current control device 108, as shown in FIG. 1.

The full-wave rectifier circuit 100 includes capacitors 132 and 134 with respective capacitances C1 and C2. A ratio of the capacitances C1 and C2 of the respective capacitors 132 and 134 can be such that the full-wave rectifier circuit 100 draws an equal amount of current during each positive and negative cycle from the AC input voltage source 102. The source of the transistor 116 is coupled to a first terminal of the capacitor 134. The first terminal of the capacitor 134 is coupled to the input of the current control device 106 and the input of the Zener diode 124. A second terminal of the capacitor 134 is coupled to an output of the current control device 110 and an input of the current control device 112. An input of the current control device 110 is coupled to the common ground node 128. An output of the current control device 112 is coupled to an output node 136 (e.g., an output terminal) and thus to the output of the current control device 108 and a first terminal of the capacitor 132. The output of the current control device 108 is coupled to the output of the current control device 112 and the first terminal of the capacitor 132. A second terminal of the capacitor 132 is coupled to the common ground node 128.

In some examples, referred to herein as a "first alternative example," the transistor 116 is driven by the controller 114 (illustrated with a dashed line in the example of FIG. 1). In the first alternative example, the gate control circuit 118 is omitted and the gate of the transistor 116 is coupled to an output of the controller 114 to receive the gate current. In other examples, referred to herein as a "second alternative example," the transistor 116 is replaced with a switch. The first end of the switch can be coupled to the first input of the current control device 112, and a second end of the switch can be coupled to the common ground node 128 in the second alternative example. In the second alternative example, the gate control circuit 118 can be omitted and the switch can be controlled by the controller 114.

By way of example, during a first positive cycle of the AC input voltage, the capacitor 132 is configured to store a first charge based on the input current. During a first negative cycle of the AC input voltage, the capacitor 132 is configured to release the stored first charge to provide a DC output current (labeled as "I_OUT") to the load 104. During the first negative cycle, the capacitor 134 can be configured to store a second charge based on the input current. During a second positive cycle of the AC input voltage, the gate control circuit can provide a voltage higher than a gate threshold voltage for the gate of the transistor 116 to cause the transistor 116 to operate in an on-state. The transistor 116 can be configured to couple the capacitor 134 to the ground terminal 130 to enable the capacitor 134 to provide the stored charge to the capacitor 132 and the load 104. For example, during the second positive cycle, the stored second charge at the capacitor 134 can be transferred to the capacitor 132 for storage in addition to the charge based on the input current. During a second negative cycle of the AC input voltage, the gate voltage is below the gate threshold and the transistor 116 is in the off-state. During the second negative cycle, the DC output current is supplied to the load 104 based on the first stored charge at the capacitor 132 and a charge transferred from the capacitor 134 to the capacitor 132 during the second positive cycle of the AC input voltage.

Accordingly, the full-wave rectifier circuit 100 can be configured to draw the input current on each of the positive and negative cycles to provide the DC output current. The full-wave rectifier circuit 100 can provide the DC output voltage with a peak amplitude that is about or similar to a peak amplitude of the AC input voltage.

Figure 2:
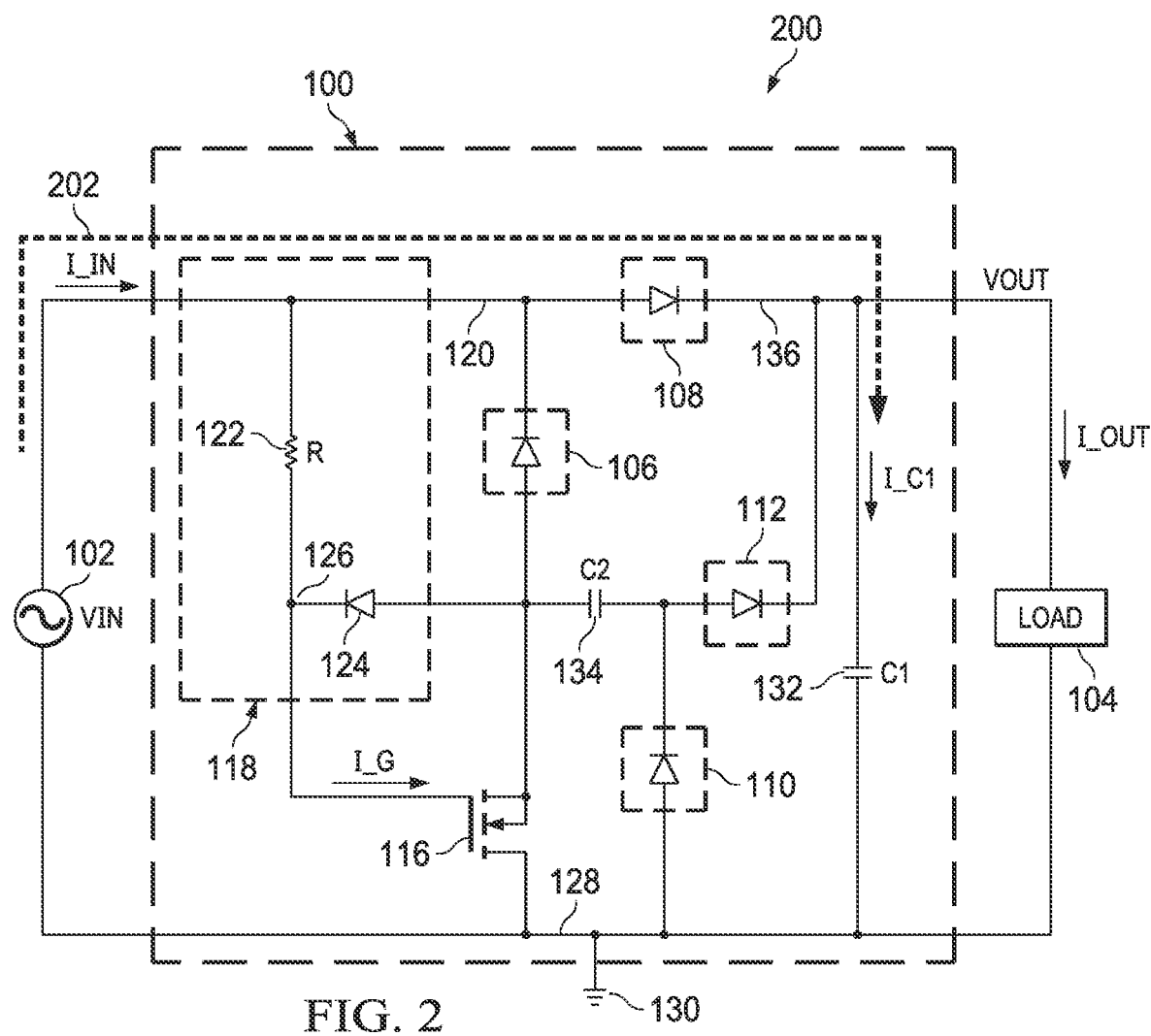
FIG. 2 is the full-wave rectifier circuit of FIG. 1 operating in a first state.
Figure 3:
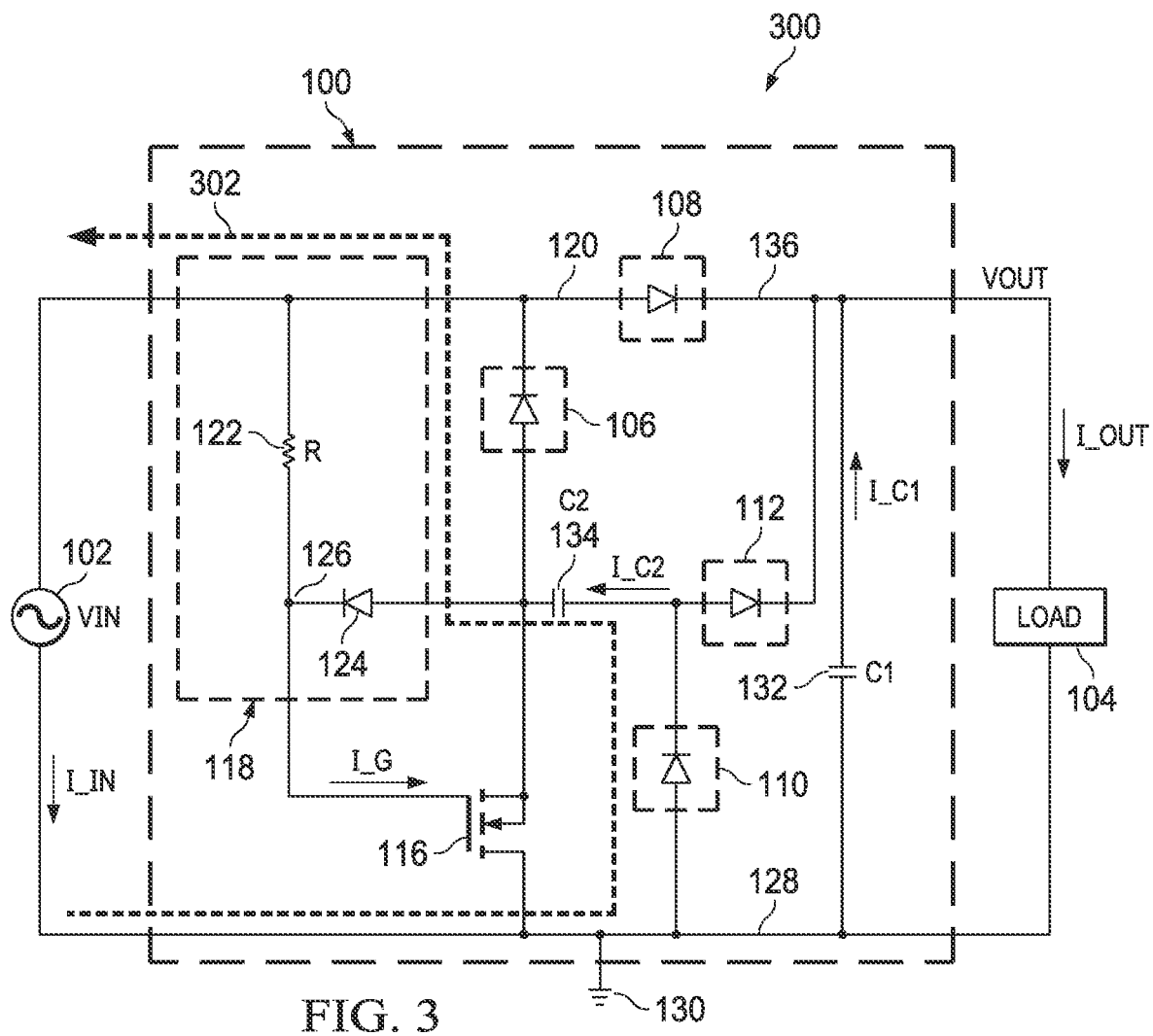
FIG. 3 is the full-wave rectifier circuit of FIG. 1 operating in a second state.
Figure 4:
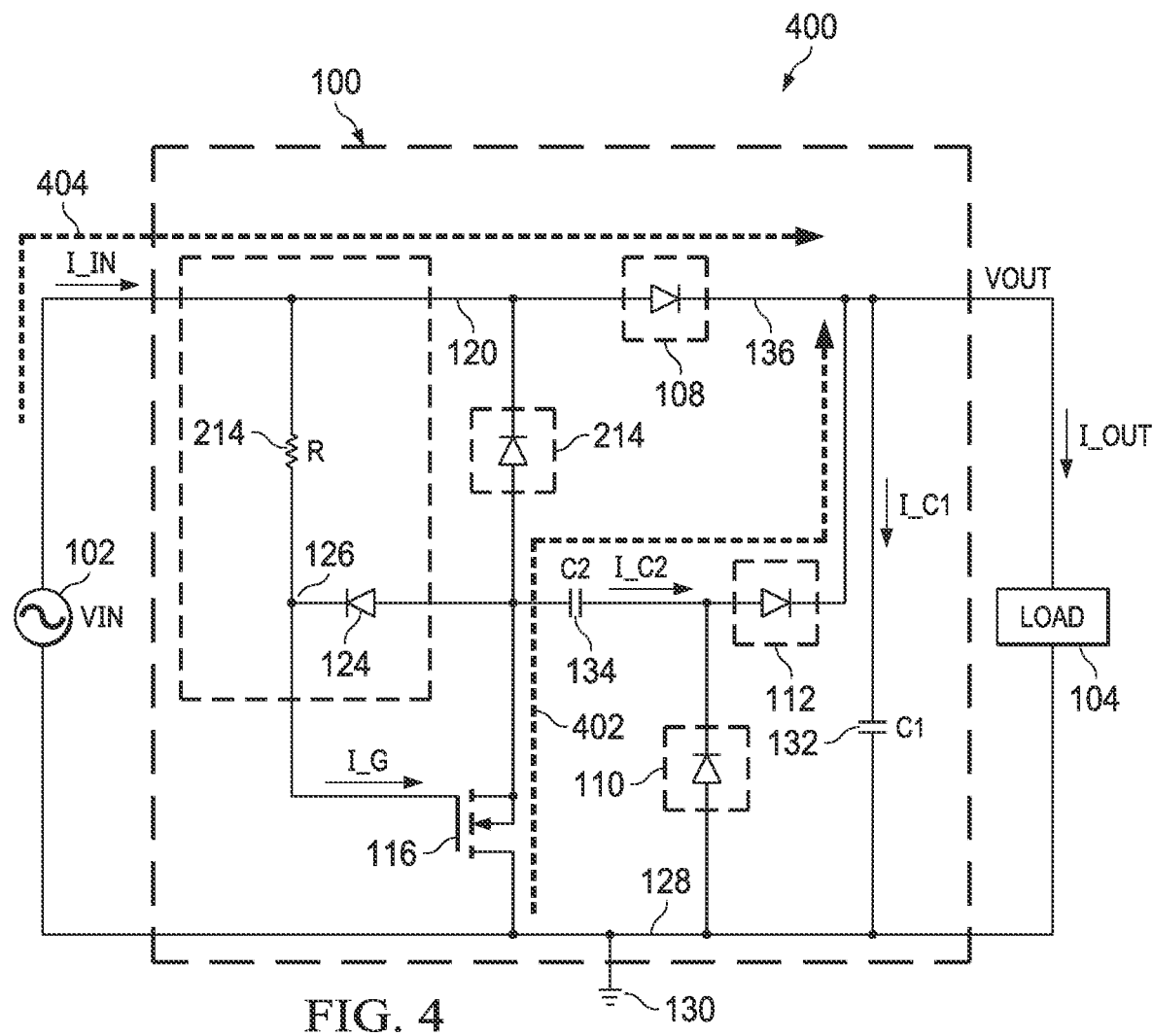
FIG. 4 is the full-wave rectifier circuit of FIG. 1 operating in a third state.

FIGS. 2-4 illustrate different operating states of the full-wave rectifier circuit 100, as shown in FIG. 1. Therefore, reference may be made to the example of FIG. 1 in the following description of examples of FIGS. 2-4. For example, FIG. 2 illustrates the full-wave rectifier circuit 100 operating in a first state 200. In the first state 200, during the first positive cycle of the AC input voltage, the full-wave rectifier circuit 100 can be configured to store the first charge at the capacitor 132 based on the input current. For example, during the first positive cycle, the input current flows along a first current path 202 toward the output node 136. A first capacitor current (labeled as "I_C1") is provided to the capacitor 132 based on the input current to store the first charge at the capacitor 132 during the first positive cycle. In the first state 200, during the first positive cycle of the AC input voltage, the full-wave rectifier circuit 100 can be configured to provide the DC output voltage at the output node 136 for the load 104. During the first positive cycle, the transistor 116 is in the off-state as the gate voltage is below the gate threshold for transistor 116.

FIG. 3 is a schematic diagram of the full-wave rectifier circuit 100 operating in a second state 300. In the second state 300, during the first negative cycle of the AC input voltage, the full-wave rectifier circuit 100 can be configured to store the second charge at the capacitor 134 based on the input current. For example, during the first negative cycle, the input current flows along a second current path 302. A second capacitor current (labeled as "I_C2") is provided to the capacitor 134 based on the input current to store the second charge at the capacitor 134 during the first negative cycle. In the second state 300, during the first negative cycle, the first capacitor current is generated by the capacitor 132 based on the first stored charge to provide the DC output current. Thus, in the second state 300, the full-wave rectifier circuit 100 can be configured to provide the DC output current to the load 104 based on the first charge stored at the capacitor 132. During the first negative cycle, the transistor 116 remains in the off-state as the gate voltage is below the gate threshold for transistor 116.

FIG. 4 is a schematic diagram of the full-wave rectifier circuit 100 operating in a third state 400. In the third state 400, during the second positive cycle of the AC input voltage, the transistor 116 is triggered (e.g., turned-on) responsive to the gate voltage exceeding the gate threshold to couple the capacitor 134 to the ground terminal 130. A first current path 402 during the second positive cycle is established in response to coupling the capacitor 134 to the ground terminal 130. The capacitor 134 can be configured to provide the second capacitor current based on the second stored charge. During the second positive cycle, the second capacitor current is provided to the output node 136. Furthermore, during the second positive cycle, the input current flows along a second current path 404 toward the output node 136. The input current and the second capacitor current are combined to store the first charge at the capacitor 132 and supply the load 104. In the third state 400, during the second positive cycle of the AC input voltage, the full-wave rectifier circuit 100 can be configured to provide the DC output voltage at the output node 136 to the load 104. The full-wave rectifier circuit 100 can be configured to operate in the second state 300 following the third state 400 and alternate between the states 300 and 400 to deliver the DC output voltage to the load 104.

Figure 5:
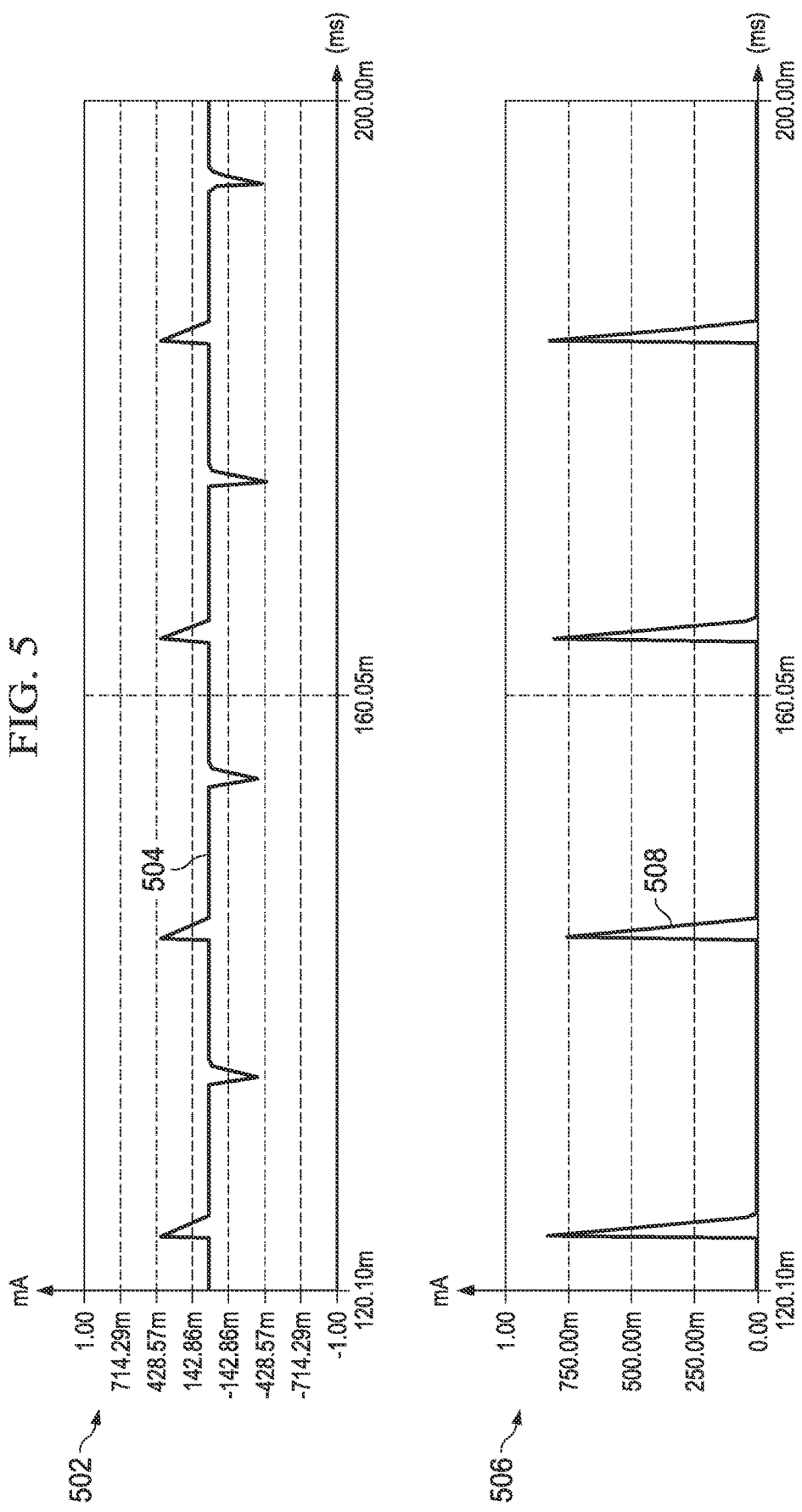
FIG. 5 illustrates input current signal diagrams.

FIG. 5 illustrates respective waveform diagrams for the full-wave rectifier circuit 100, as shown in FIG. 1, and a half-wave rectifier circuit. The half-wave rectifier circuit can be constructed with a diode connected in series with a capacitor. In the example of FIG. 5, the waveform diagrams include a first waveform diagram 502 illustrating an input current 504 provided to the full-wave rectifier circuit 100, and a second waveform diagram 506 illustrating an input current 508 provided to the half-wave rectifier circuit. In the example of FIG. 5, the input current 504 can be the input current I_IN, as shown in FIG. 1. Therefore, reference may be made to the example of FIG. 1 in the following description of the example of FIG. 5. The first and second waveform diagrams 502 and 506 include a vertical axis representing a current in milliamps (mA), and a horizontal axis representing time in milliseconds (ms). As shown in FIG. 5, the input current 504 has an amplitude that is close to half the amplitude of the input current 508 during positive half cycles of an AC input voltage drawn by the full-wave rectifier circuit 100 and the half-wave rectifier circuit.

Figure 6:
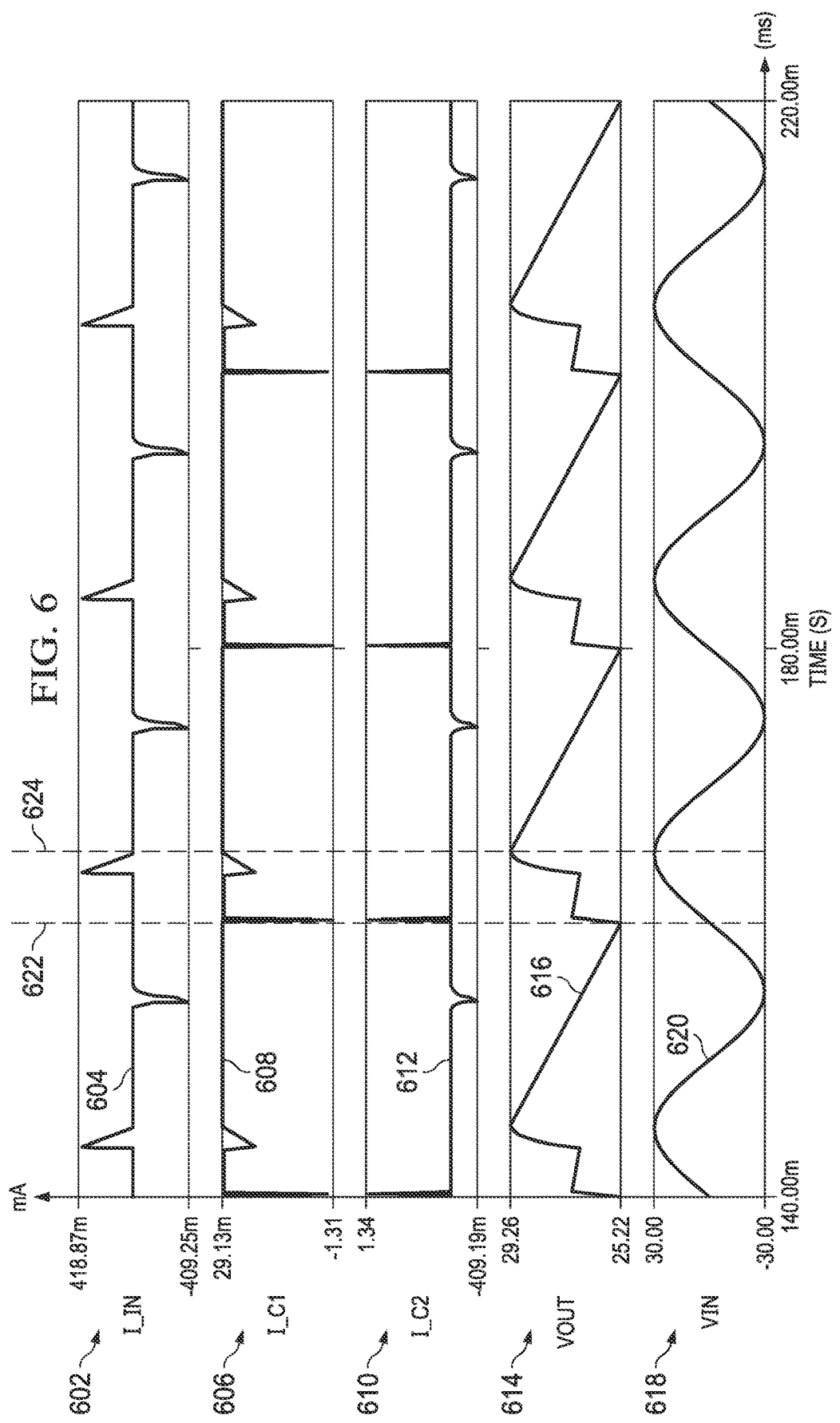
FIG. 6 illustrates waveform diagrams associated with operations of the full-wave rectifier circuit of FIG. 1.

FIG. 6 illustrates waveform diagrams associated with operational states (e.g., the first, second, and third states 200, 300, and 400, as shown in FIGS. 2-4) of the full-wave rectifier circuit 100, as shown in FIG. 1. Therefore, reference may be made to the examples of FIGS. 1-4 in the following description of the example of FIG. 6. In the example of FIG. 6, the waveform diagrams include a first waveform diagram 602 illustrating an input current 604 (labeled as "I_IN") that is the input current I_IN, as shown in FIGS. 1-4, a second waveform diagram 606 illustrating a first capacitor current 608 (labeled as "I_C1") that is the first capacitor current I_C1, as shown in FIG. 2, a third waveform diagram 610 illustrating a second capacitor current 612 (labeled as "I_C2") that is the second capacitor current I_C2, as shown in FIG. 3, a fourth waveform diagram 614 illustrating a DC output voltage (labeled as "VOUT") that is the DC output voltage VOUT, as shown in FIGS. 1-4, and fifth waveform diagram 618 illustrating an AC input voltage 620 (labeled as "VIN") that is the AC input voltage VIN, as illustrated in FIGS. 1-4.

By way of example, at about a time 622 during a positive cycle of the AC input voltage 620, the transistor 116 is triggered (e.g., turned-on) responsive to the gate voltage exceeding the gate threshold to couple the capacitor 134 to the ground terminal 130. At about the time 622, the capacitor 134 can be configured to provide the second capacitor current 612 to the output node 136. A charge is stored at the capacitor 132 based on the second capacitor current 612. Thus, the second charge stored at the capacitor 134 is transferred to the capacitor 132 for storage as the first charge. The charge stored at the capacitor 134 is transferred to the capacitor 132 until a charge equilibrium is obtained between the capacitors 132 and 134 at a time after the time 622, as shown in FIG. 6. As described herein, during the positive cycle of the AC input voltage 620, the full-wave rectifier circuit 100 can be configured to provide the DC output voltage 616 at the output node 136 to the load 104. Between about the time 622 to about a time 624 the DC output voltage 616 can increase to a peak amplitude. At about the time 624, the peak amplitude of the DC output voltage 616 is at about a peak amplitude of the AC input voltage 620, as shown in FIG. 6. Thus, the peak amplitude of the DC output voltage 616 during the positive cycle of AC input voltage 620 is similar to the peak amplitude of the AC input voltage 620.

Figure 7:
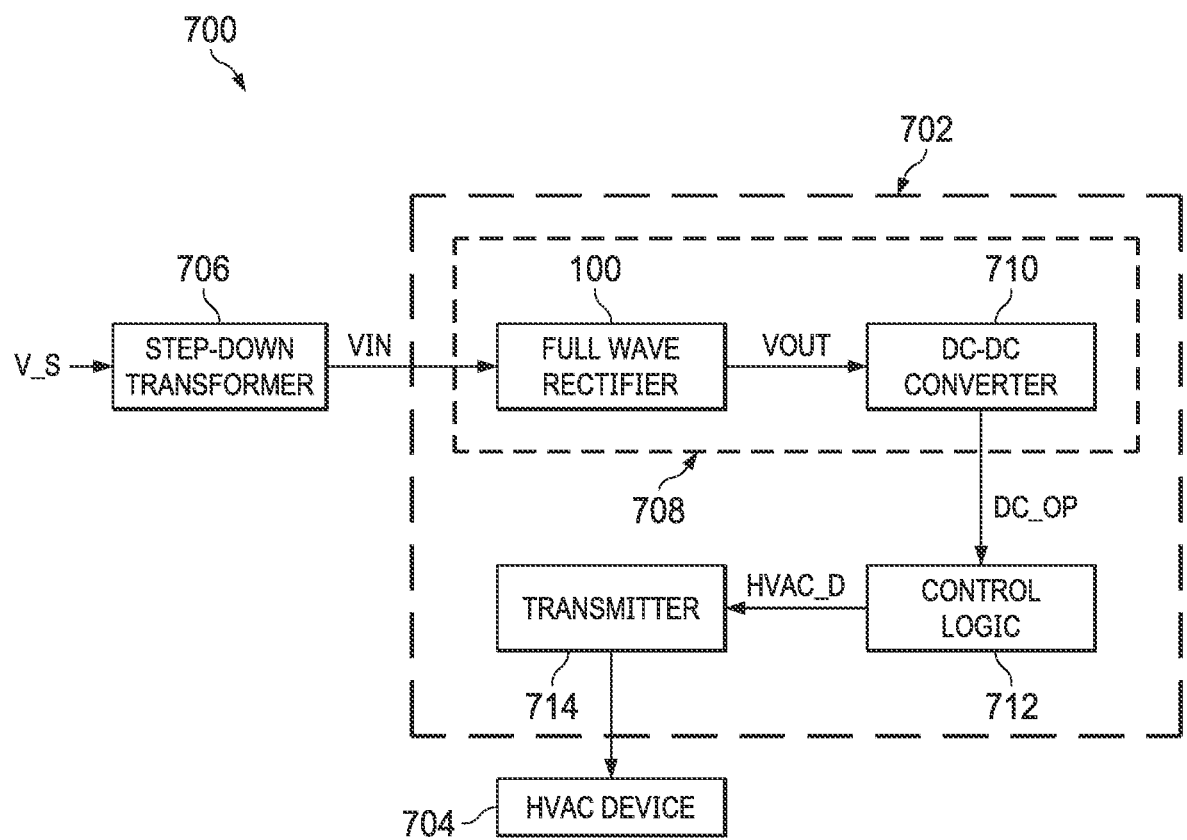
FIG. 7 is a block diagram of a Heating, Ventilation, and Air Conditioning (HVAC) control system.

FIG. 7 is a block diagram of an HVAC system 700. The HVAC system 700 can include an HVAC controller 702, which can be used to control an HVAC device 704. By way of example, the HVAC controller 702 is a fan coil unit (FCU) controller, and the HVAC device 704 is an FCU. In some examples, the HVAC system 700 includes a step-down transformer 706. The step-down transformer 706 can be configured to receive an AC source voltage (labeled as "V_S") from an external AC source (e.g., 120V or 220V AC source). The step-down transformer 706 can be configured to step-down the AC source voltage to provide an AC input voltage (labeled as "VIN"). The HVAC controller 702 can include a power supply circuit 708 that can include the full-wave rectifier circuit 100, as shown in FIG. 1. Therefore, reference may be made to the example of FIG. 1 in the following description of the example of FIG. 7. The full-wave rectifier circuit 100 can be configured to rectify the AC input voltage to provide a DC output voltage (labeled as "VOUT") as described herein.

The DC output voltage can be supplied to a DC-DC converter 710 of the power supply circuit 708. The DC-DC converter 710 can be configured to receive the DC output voltage to provide a DC operating voltage (labeled as "DC_OP"). In some examples, the DC-DC converter is implemented as an integrated circuit (IC) (e.g., a buck converter IC) that includes non-capacitor circuit elements of the full-wave rectifier circuit 100 (e.g., circuit elements 106-112, 116, and 122-124, as shown in FIG. 1). Thus, a DC-DC IC can include the non-capacitor circuit elements of the full-wave rectifier circuit 100, and the capacitors 132 and 134 can be coupled externally to respective circuit elements of the non-capacitor circuit elements to result in the configuration as shown in FIG. 1. In some examples, the transistor 116 is incorporated into the DC-DC IC as part of the non-capacitor circuit elements. In other examples, the transistor 116 is external and coupled to respective circuit elements of the non-capacitor circuit elements within the DC-DC IC to result in the configuration as shown in FIG. 1.

By way of further example, the DC operating voltage is provided to components of the HVAC controller 702, such as control logic 712 to enable operations of the control logic 712. The control logic 712 can be representative of hardware for implementing logical functions of the HVAC controller 702. The control logic 712 can be representative of a microcontroller (MCU). For example, the control logic 712 once enabled (e.g., powered) can generate control data or signal (labeled as "HVAC_D"). A transmitter 714 of the HVAC controller 702 can be configured to communicate the control data to the HVAC device 704. In some examples, the HVAC device 704 includes a receiver that can receive the control data and provide the control data to local control logic for controlling the HVAC device 704 or an external device coupled to the HVAC device 704 (e.g., enabling a motor, fan, etc.). In some examples, the HVAC device 704 and HVAC controller 702 are interconnected through bidirectional signals generated by transmitting and receiving circuits. In some examples, these signals are non-isolated and use a same reference wire (e.g., neutral wire).

In the drawings, like reference numerals refer to like elements throughout, and the various features are not necessarily drawn to scale. Also, the term "couple" or "couples" includes indirect or direct electrical or mechanical connection or combinations thereof. For example, if a first device couples to or is coupled with a second device, that connection may be through a direct electrical connection, or through an indirect electrical connection via one or more intervening devices and connections. One or more operational characteristics of various circuits, systems and/or components are hereinafter described in the context of functions which in some cases result from configuration and/or interconnection of various structures when circuitry is powered and operating.

Modifications are possible in the described embodiments, and other embodiments are possible, within the scope of the claims.

What is claimed is:

1. A circuit comprising:
   a first capacitor;
   a first current control device configured to provide an input current to the first capacitor during a positive cycle of an alternating current (AC) input voltage;
   a second capacitor having first and second terminals, the second capacitor configured to store a charge;
   a switch coupled between the first terminal of the second capacitor and a ground terminal, wherein the switch is configured to discharge the second capacitor during the positive cycle of the input voltage, providing a capacitor current, responsive to the stored charge in the second capacitor; and
   a second current control device configured to provide current to the first capacitor during the positive cycle of the input voltage, wherein the first capacitor is configured to store a charge responsive to the input current and the capacitor current.

2. The circuit of claim 1, wherein current flows along a first path from the second terminal of the second capacitor toward the second current control device during the positive cycle of the input voltage, the circuit further comprising:
   a third current control device; and
   a fourth current control device, in which the third current control device is configured to provide the input current to the second terminal of the second capacitor along a second path to the fourth current control device during a negative cycle of the input voltage.

3. The circuit of claim 2, wherein the switch is disabled during the negative cycle of the input voltage.

4. The circuit of claim 3, wherein the switch includes a field effect transistor (FET) coupled between the first terminal of the second capacitor and the ground terminal, and having a control terminal configured to receive the input voltage.

5. The circuit of claim 4, wherein the circuit further comprises a gate control circuit coupled to a gate of the FET, and the gate control circuit is configured to activate the FET during the positive cycle of the input voltage.

6. The circuit of claim 5, wherein the gate control circuit includes:
a resistor coupled between an input terminal and the gate of the FET; and
a Zener diode coupled between the gate of the FET and a drain of the FET.

7. The circuit of claim 6, wherein the first, second, third, and fourth respective current control devices are first, second, third and fourth switches, respectively, and the first and second switches are each configured to activate during the positive cycle of the input voltage responsive to respective switch control signals, and the third and fourth switches are each configured to activate during the negative cycle of the input voltage.

8. The circuit of claim 7, wherein the respective switch control signals are provided by a controller.

9. The circuit of claim 6, wherein the first, second, third, and fourth current control devices are each diodes.

10. The circuit of claim 9, wherein the first current control device is coupled to the input terminal, which is configured to receive the input voltage.

11. A system comprising:
a rectifier having a rectifier input and a rectifier output, wherein the rectifier input is configured to receive an alternating current (AC) input voltage, the rectifier comprising:
a first capacitor;
a first current control device configured to provide an input current to the first capacitor during a positive cycle of the AC input voltage;
a second capacitor having first and second capacitor terminals, wherein the second capacitor is configured to store a charge;
a switch coupled between the first capacitor terminal and a ground terminal, wherein closing the switch discharges the charge stored the second capacitor, providing a capacitor current, during the positive cycle of the input voltage;
a second current control device configured to provide the capacitor current to the first capacitor during the positive cycle of the input voltage, and the first capacitor is configured to store a charge responsive to the input current and the capacitor current; and
a power converter having a converter input and a converter output, wherein the converter input is coupled the rectifier output, and the power converter is configured to provide a regulated output voltage at the converter output responsive a direct current (DC) output voltage at the rectifier output.

12. The system of claim 11, wherein the power converter is a direct-current-to-direct-current (DC-DC) integrated circuit (IC), and the DC-DC IC includes the first current control device, the second current control device, and the switch.

13. The system of claim 12, further comprising a step-down transformer configured to provide the AC input voltage at the rectifier input, in which the AC input voltage is provided by an AC source.

14. The system of claim 13, wherein current flows along a first path from the second capacitor terminal toward the second current control device during the positive cycle of the input voltage, the system further comprising:
a third current control device; and
a fourth current control device, in which the third current control device is configured to provide current to the second capacitor terminal along a second path to the fourth current control device during a negative cycle of the AC input voltage;
wherein the switch is disabled during the negative cycle of the AC input voltage.

15. A circuit comprising:
a first current control device having a first current control input and a first current control output;
a second current control device having a second current control input and a second current control output, wherein the second current control input is coupled to the first current control output;
a third current control device having a third current control input and a third current control output, wherein the third current control output is coupled to the second current control output;
a fourth current control device having a fourth current control input and a fourth current control output, wherein the fourth current control output is coupled to the third current control input, and the fourth current control input is coupled to a common terminal;
a first capacitor having first and second capacitor terminals, wherein the first capacitor terminal is coupled to the second current control output, and the second capacitor terminal is coupled to the common terminal;
a second capacitor having third and fourth capacitor terminals, wherein the third capacitor terminal is coupled to the first current control input, and the fourth capacitor terminal is coupled to third current control input and to the fourth current control input; and
a switch coupled between the third capacitor terminal and the common terminal.

16. The circuit of claim 15, wherein the switch includes a transistor having a gate and a drain, in which the drain is the first current control input, the circuit further comprising a gate control circuit having a gate control output coupled to the gate of the transistor.

17. The circuit of claim 16, wherein the gate control circuit includes:
a resistor coupled between an input terminal and the gate of the transistor, and
a Zener diode coupled to between the gate of the transistor and the drain of the transistor.

18. The circuit of claim 15, wherein each of the first, second, third, and fourth current control devices is a respective diode, and the switch is a transistor.

19. The circuit of claim 18, wherein:
the second current control device is configured to provide an input current to the first capacitor during a positive cycle of an AC input voltage;
the second capacitor is configured to store a charge;
the switch is configured to couple the second capacitor to the common terminal so the second capacitor discharges a capacitor current during the positive cycle of the AC input voltage responsive to the stored charge in the second capacitor; and the third current control device is configured to provide the capacitor current to the first capacitor during the positive cycle of the AC input voltage, and the first capacitor is configured to store a charge responsive to the input current and the capacitor current.

20. The circuit of claim 19, wherein:

the capacitor current flows along a first path from the fourth capacitor terminal toward the third current control device during the positive cycle of the AC input voltage;

the fourth current control device is configured to provide the input current to the fourth capacitor terminal along a second path to the first current control device during a negative cycle of the AC input voltage so the second capacitor stores the charge responsive to the capacitor current during the negative cycle of the AC input voltage; and the switch is disabled during the negative cycle of the AC input voltage.

* * * * *